US00RE45956E

(19) United States
(12) Reissued Patent
Gu

(10) Patent Number: US RE45,956 E
(45) Date of Reissued Patent: *Mar. 29, 2016

(54) BATTERY UNIT, LITHIUM POLYMER BATTERY USING THE SAME, AND METHOD FOR MANUFACTURING LITHIUM POLYMER BATTERY

(71) Applicant: SAMSUNG SDI CO., LTD., Suwon-si (KR)
(72) Inventor: Chang-Il Gu, Kimhae (KR)
(73) Assignee: Samsung SDI Co., Ltd., Suwon (KR)

( * ) Notice: This patent is subject to a terminal disclaimer.
(21) Appl. No.: 14/271,000
(22) Filed: May 6, 2014

Related U.S. Patent Documents

Reissue of:
(64) Patent No.: 7,687,194
Issued: Mar. 30, 2010
Appl. No.: 11/613,498
Filed: Dec. 20, 2006

U.S. Applications:
(62) Division of application No. 13/403,600, filed on Feb. 23, 2012, now Pat. No. Re. 44,960, which is an application for the reissue of Pat. No. 7,687,194.

(30) Foreign Application Priority Data

Feb. 6, 2002 (KR) ..... 10-2002-0006737

(51) Int. Cl.
*H01M 2/14* (2006.01)
*H01M 10/0585* (2010.01)
(Continued)

(52) U.S. Cl.
CPC ..... *H01M 2/145* (2013.01); *H01M 2/16* (2013.01); *H01M 2/22* (2013.01);
(Continued)

(58) Field of Classification Search
CPC ..... H01M 2/145; H01M 2/16; H01M 2/22; H01M 10/0436; H01M 10/0585; H01M 10/052; Y10T 29/49108; Y10T 29/49115; Y10T 29/49114; Y02E 60/122
See application file for complete search history.

(56) References Cited

U.S. PATENT DOCUMENTS 6,251,537 B1 * 6/2001 Kim et al. ..... 429/181
6,383,234 B1 * 5/2002 Noh ..... 29/623.1
(Continued)

FOREIGN PATENT DOCUMENTS

CN 1189925 8/1998
JP 10-302751 11/1998
(Continued)

OTHER PUBLICATIONS

Non-Final Office Action issued for related U.S. Appl. No. 10/347,251 dated Nov. 3, 2004.
(Continued)

*Primary Examiner* — Krisanne Jastrzab
(74) *Attorney, Agent, or Firm* — H.C. Park & Associates, PLC

(57) ABSTRACT

A battery unit with improved safety measures, a lithium polymer battery using the battery unit, and a method for manufacturing the lithium polymer battery are provided. The lithium polymer battery has a battery unit and a case accommodating the battery unit, wherein the battery unit includes: a cathode plate having a cathode collector and a cathode active material layer coated on at least one surface of the cathode collector; a cathode lead electrically connected to the cathode collector; an anode plate having an anode collector and an anode active material layer coated on at least one surface of the anode collector; an anode lead electrically connected to the anode collector; a separator interposed between the cathode plate and the anode plate, which insulates the cathode plate and the anode plate from each other; and an insulating member formed on at least one of the cathode lead and the anode lead, which prevents a short circuit between the cathode lead and the anode plate or between the anode lead and the cathode plate. In the battery unit, the cathode plate, the separator, and the anode plate are sequentially and repeatedly stacked upon one another. Therefore, the insulating member incorporated in the lithium polymer battery can enhance the safety of the battery.

9 Claims, 5 Drawing Sheets

(51) Int. Cl.

| | |
|---|---|
| ***H01M 2/16*** | (2006.01) |
| ***H01M 2/22*** | (2006.01) |
| ***H01M 10/04*** | (2006.01) |
| ***H01M 10/052*** | (2010.01) |

(52) U.S. Cl.
CPC ..... *H01M 10/0436* (2013.01); *H01M 10/052* (2013.01); *H01M 10/0585* (2013.01); *Y02E 60/122* (2013.01); *Y10T 29/49108* (2015.01); *Y10T 29/49114* (2015.01); *Y10T 29/49115* (2015.01)

(56) References Cited

U.S. PATENT DOCUMENTS

| | | | | |
|---|---|---|---|---|
| 6,451,484 | B1 * | 9/2002 | Han et al. | 429/231.95 |
| 6,692,866 | B2 * | 2/2004 | Watanabe et al. | 429/129 |
| 6,706,080 | B2 * | 3/2004 | Akahira | 29/623.1 |
| 2002/0031703 | A1 * | 3/2002 | Kameyama et al. | 429/162 |

FOREIGN PATENT DOCUMENTS

| | | |
|---|---|---|
| JP | 10302751 | 11/1998 |
| JP | 11-121043 | 4/1999 |
| JP | 11121043 | 4/1999 |
| JP | 11-273659 | 10/1999 |
| JP | 2003-11719 | 11/2000 |
| JP | 2001-202945 | 7/2001 |
| JP | 2001-325945 | 11/2001 |
| JP | 2001325945 | 11/2001 |
| KR | 2002-0039097 | 5/2002 |
| WO | 01/59855 | 8/2001 |
| WO | 01/059855 | 8/2001 |

OTHER PUBLICATIONS

Final Office Action issued for related U.S. Appl. No. 10/347,251 dated May 5, 2005.
Non-Final Office Action issued for related U.S. Appl. No. 10/347,251 dated Sep. 23, 2005.
Non-Final Office Action issued for related U.S. Appl. No. 10/347,251 dated Jan. 26, 2006.
Final Office Action issued for related U.S. Appl. No. 10/347,251 dated Jun. 23, 2006.
Notice of Allowance issued for related U.S. Appl. No. 10/347,251 dated Sep. 20, 2006.
Non-Final Office Action issued for related U.S. Appl. No. 11/613,498 dated Mar. 18, 2008.
Non-Final Office Action issued for related U.S. Appl. No. 11/613,498 dated Oct. 8, 2008.
Non-Final Office Action issued for related U.S. Appl. No. 11/613,498 dated Apr. 6, 2009.
Notice of Allowance issued for related U.S. Appl. No. 11/613,498 dated Nov. 17, 2009.
Non-Final Office Action issued for related U.S. Appl. No. 13/403,600 dated Jun. 4, 2012.
Final Office Action issued for related U.S. Appl. No. 13/403,600 dated May 16, 2013.

* cited by examiner

BATTERY UNIT, LITHIUM POLYMER BATTERY USING THE SAME, AND METHOD FOR MANUFACTURING LITHIUM POLYMER BATTERY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This application is a continuation of prior application Ser. No. 10/347,251, filed on Jan. 21, 2003, which claims the benefit of Korean Patent Application No.: 2002-0006737, filed Feb. 6, 2002, which are both hereby incorporated by reference for all purposes as if fully set forth herein.]

*More than one reissue application has been filed for the reissue of U.S. Pat. No. 7,687,194. The reissue applications are application Ser. No. 13/403,600, filed on Feb. 23, 2012, and reissued as U.S. Pat. No. Re. 44,960, and the present divisional reissue application, application Ser. No. 14/271,000, filed on May 6, 2014.*

*This application is a reissue divisional of U.S. patent application Ser. No. 13/403,600, filed on Feb. 23, 2012, and reissued as U.S. Pat. No. Re. 44,960, which is an application for reissue of U.S. Pat. No. 7,687,194, filed on Dec. 20, 2006, as U.S. patent application Ser. No. 11/613,498, which is a continuation of U.S. patent application Ser. No. 10/347,251, filed on Jan. 21, 2003, now issued as U.S. Pat. No. 7,169,505, which claims the benefit of Korean Patent Application No. 10-2002-0006737, filed on Feb. 6, 2002, each of which is hereby incorporated by reference for all purposes as if fully set forth herein.*

BACKGROUND OF THE INVENTION

1. Field of the Invention

The present invention relates to a lithium polymer battery, and more particularly, to a battery unit configured to prevent a short circuit due to contact between the electrode leads and the electrode plates, a lithium polymer battery using the battery unit, and a method for manufacturing the lithium polymer battery.

2. Description of the Related Art

Lithium secondary batteries have a high energy density per unit weight and an operating voltage of 3.6V or greater, which is three times higher than nickel-cadmium (Ni—Cd) batteries, nickel-metal hydride (Ni-MH) batteries, and nickel-hydrogen batteries. For these reasons, their use has become widespread. Lithium secondary batteries can be classified into lithium-ion batteries that use a liquid organic electrolyte and lithium polymer batteries that use a solid polymeric electrolyte.

Specifically, lithium polymer batteries are rather safe and can accommodate a variety of shapes, especially, in thin film form to comply with the need for small, lightweight, portable electronic products. These properties could not typically be achieved in lithium-ion batteries. Due to these advantages, the lithium polymer battery has recently attracted attention.

Referring to FIGS. 1A and 1B, a conventional lithium polymer battery 10 is shown. The conventional lithium polymer battery 10 includes a battery unit 11, an electrode lead 12 drawn out from the battery unit 11, an electrode terminal 13 welded to the plurality of electrode leads 12, and a case 14 for accommodating the battery unit 11.

The battery unit 11 has a structure in which a cathode plate, an insulating separator, and an anode plate are sequentially and repeatedly stacked upon one another. The electrode lead 12 is drawn out from each of the cathode and anode plates of the battery unit 11. A plurality of electrode leads 12 drawn out from the electrode plates of the battery unit 11 are electrically connected to electrode terminals 13, wherein a portion of the electrode terminal 13 is exposed to the outside of the case 14. The case 14, shown in FIG. 1A as a pouch shape provides space for accommodating the battery unit 11.

The case 14 has a sealing portion 14a to be coupled to another element to seal the battery unit 11 placed in the case 14. A sealing tape 15 is wound around a portion of the electrode terminals 13 which contacts the sealing portion 14a. Accordingly, as the sealing portion 14a is thermally fused to seal the case 14, the sealing tape 15 is also fused and bound to internal layers of the case 14, thereby enhancing the hermetic containment of the battery.

However, the conventional lithium polymer battery 10 has the following problems. A group of electrode leads 12 extending from electrode plates, which have the same polarity as the electrode leads 12, is bent in a U-shape and then welded to one electrode terminal 13. When the insulating separator shrinks due to overheating during the manufacturing process or during operation of the lithium polymer battery 10, the electrode leads 12 may contact the electrode plates of the battery unit 11 having the opposite polarity to the electrode leads 12, thereby causing one or more short circuits.

In the case where the battery unit 11 has a stacked structure where the cathode and anode plates are stacked upon one another, sharp burrs may result at the edges of the electrode leads 12 in cutting a stack of the electrode plates to form the battery unit 11. The electrode leads 12 with such burrs may penetrate one of the insulating separators and directly contact electrode plates having the opposite polarity to the electrode leads 12, resulting in the occurrence of one or more short circuits in the battery.

Heat generated when a short circuit occurs in the battery unit 11 is transferred to a thin polymeric layer coated on the inner surface of the case 14. Accordingly, the thin polymeric film melts, and the electrode leads 12 electrically contact metal foil which is included as an intermediate structural layer of the case 14. As a result, the case 14 gradually corrodes depending on a difference in ionization with respect to the electrode plates of the battery unit 11.

SUMMARY OF THE INVENTION

Accordingly, the invention provides a battery unit with improved safety measures, in which electrical contact between electrode plates and electrode leads that have opposite polarities with respect to each other is blocked. The invention also includes a lithium polymer battery with the battery unit, and a method for manufacturing the lithium polymer battery.

In one embodiment of the present invention, a battery unit includes a cathode plate having a cathode collector and a cathode active material layer coated on at least one surface of the cathode collector; a cathode lead electrically connected to the cathode collector; an anode plate having an anode collector and an anode active material layer coated on at least one surface of the anode collector; an anode lead electrically connected to the anode collector; a separator interposed between the cathode plate and the anode plate, which insulates the cathode plate and the anode plate from each other; and an insulating member formed on at least one of the cathode lead and the anode lead, which prevents a short circuit between the cathode lead and the anode plate or between the anode lead and the cathode plate.

In another embodiment, the present invention provides a lithium polymer battery comprising a battery unit and a case accommodating the battery unit, wherein the battery unit includes: a cathode plate having a cathode collector and a cathode active material layer coated on at least one surface of the cathode collector; a cathode lead electrically connected to the cathode collector; an anode plate having an anode collector and an anode active material layer coated on at least one surface of the anode collector; an anode lead electrically connected to the anode collector; a separator interposed between the cathode plate and the anode plate, which insulates the cathode plate and the anode plate from each other; and an insulating member formed on at least one of the cathode lead and the anode lead, which prevents a short circuit between the cathode lead and the anode plate or between the anode lead and the cathode plate, and in the battery unit the cathode plate, the separator, and the anode plate are sequentially repeatedly stacked upon one another.

In yet another embodiment, the present invention provides a method for manufacturing a lithium polymer battery, the method comprising: mixing source materials for an electrode active material layer; coating at least one surface of a collector substrate with the mixture of the source materials in a pattern corresponding to the electrode active material layer; cutting the collector substrate with the pattern of the electrode active material layer into individual collectors; pre-attaching an insulating member to an electrode lead extending from each of the collectors; thermally fusing the insulating member to the electrode lead; and completing formation of an electrode plate including the collector which has the electrode active material layer and the electrode lead which extends from the collector and to which the insulating member is fused.

In another embodiment, the present invention provides a method for manufacturing a lithium polymer battery, the method comprising: mixing source materials for an electrode active material layer; coating at least one surface of a collector substrate with the mixture of the source materials in a pattern corresponding to the electrode active material layer; cutting the collector substrate with the pattern of the electrode active material layer into individual collectors; dropping a composition for an insulating member onto an electrode lead extending from each of the collectors; fixing the composition dropped onto the electrode lead by compression molding to form the insulating member; completing formation of an electrode plate including the collector which has the electrode active material layer and the electrode lead which extends from the collector and on which the insulating member is formed by compression molding.

BRIEF DESCRIPTION OF THE DRAWINGS

The above objects and advantages of the present invention will become more apparent by describing in detail exemplary embodiments thereof with reference to the attached drawings.

DETAILED DESCRIPTION OF THE INVENTION

Figure 1A:
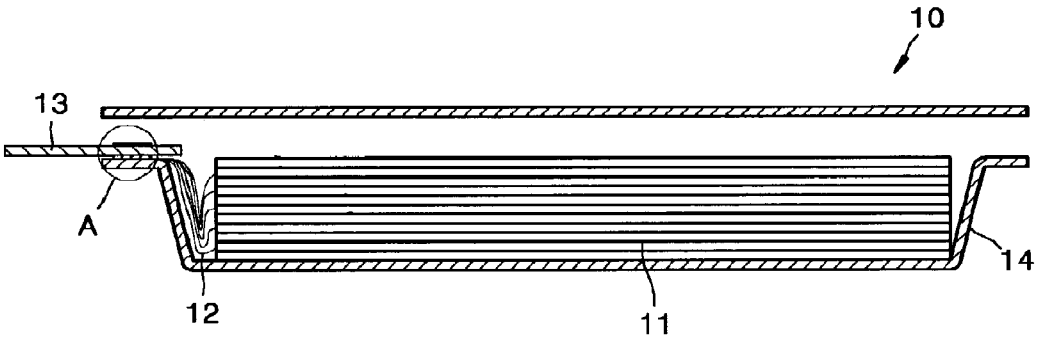
FIG. 1A (PRIOR ART)
FIG. 1A is a sectional view of a conventional lithium polymer battery.
Figure 1B:
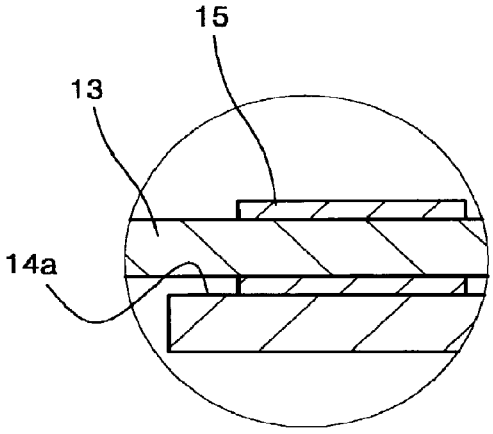
FIG. 1B (PRIOR ART)
FIG. 1B is an enlarged view of portion A of FIG. 1A.
Figure 2A:
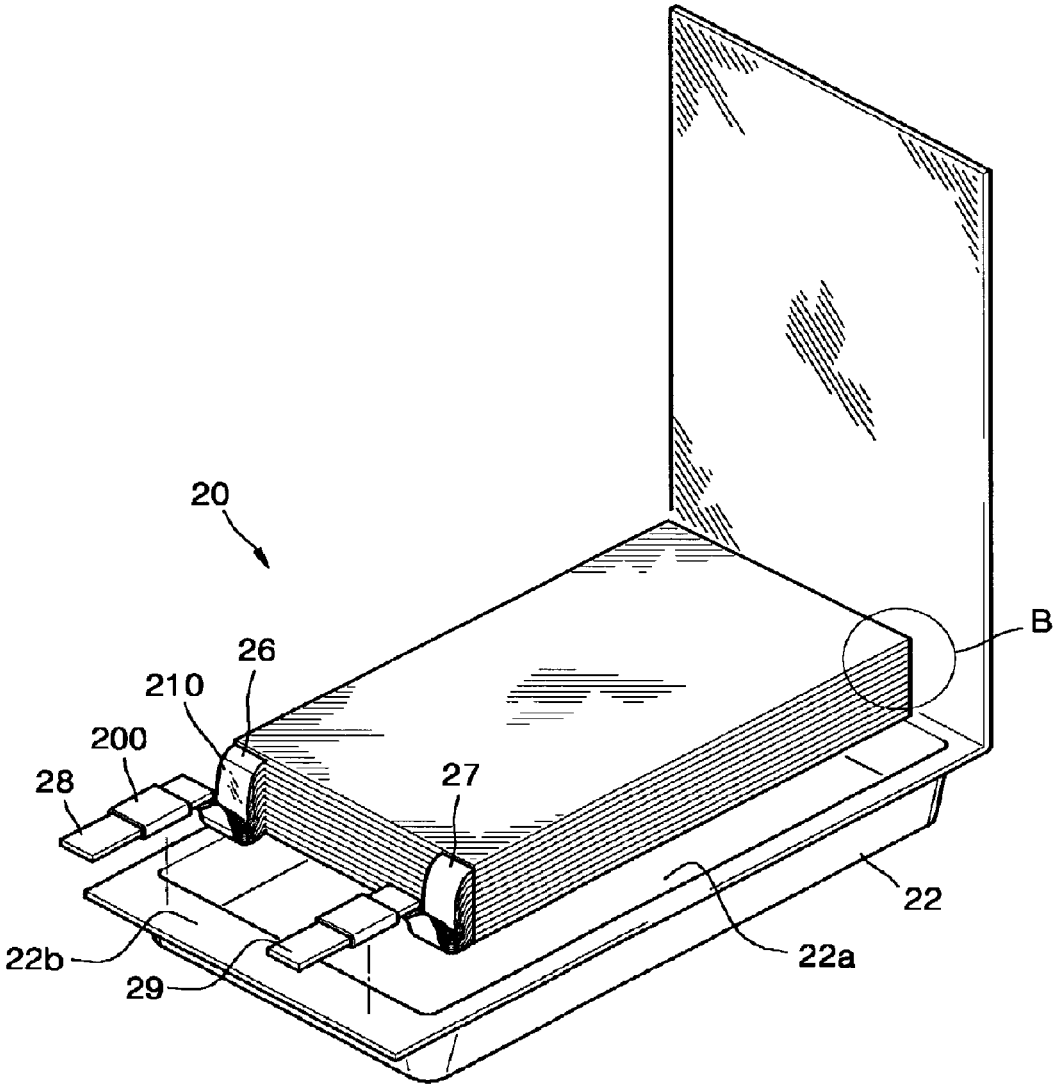
FIG. 2A is an exploded perspective view of a lithium polymer battery according to an embodiment of the present invention.
Figure 2B:
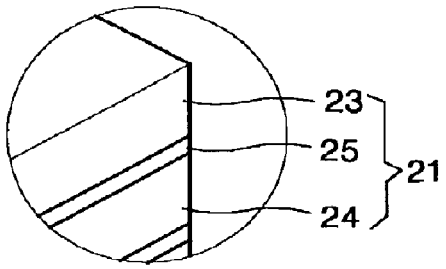
FIG. 2B is an enlarged view of portion B of FIG. 2A.

Referring to FIGS. 2A and 2B, a lithium polymer battery 20 according to one embodiment of the present invention is shown. The lithium polymer battery 20 includes a battery unit 21 and a case 22 for accommodating the battery unit 21. The battery unit 21 includes a cathode plate 23, an anode plate 24, and a separator 25 interposed between the cathode plate 23 and the anode plate 24 for insulating the cathode plate 23 and the anode plate 24 from each other. In the battery unit 21, the cathode plate 23, the separator 25, and the anode plate 24 are sequentially and repeatedly stacked upon one another.

The cathode plate 23 consists of a cathode collector and a cathode active material layer coated on at least one surface of the cathode collector. The anode plate 24 consists of an anode collector and an anode active material layer coated on at least one surface of the anode collector.

A cathode lead 26 and an anode lead 27 are drawn out from the respective cathode and anode plates 23 and 24 the ends of the cathode and anode leads 26 and 27 are welded to respective cathode and anode terminals 28 and 29.

The battery unit 21 including the cathode plate 23, the anode plate 24, and the separator 25 is mounted in a space 22a of the case 22. A portion of the cathode and anode terminals 28 and 29 extend out of the case 22.

The case 22 has a sealing portion 22b at which the case 22 containing the battery unit 21 is sealed. A sealing tape 200 is wound around a portion of the cathode and anode terminals 28 and 29 which contacts the sealing portion 22b. The sealing tape 200 is fused and bound to the sealing portion 22b of the pouch type case 22 during a sealing process by thermal fusion, thereby enhancing the hermitic containment of the battery. An insulating member 210 is formed around each of the cathode leads 26 to prevent direct contact with the anode plate 24.

The structure of the secondary battery according to the present invention will be described in detail with reference to FIG. 3.

Figure 3:
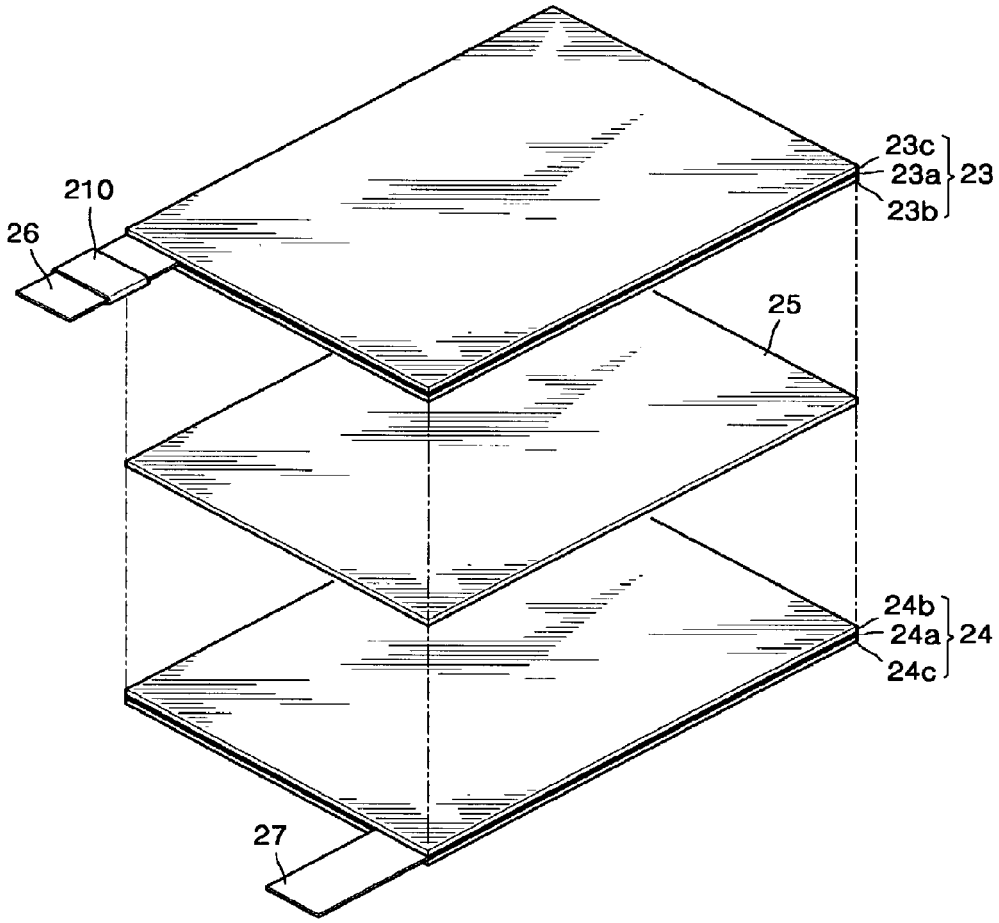
FIG. 3 is an exploded perspective view of a battery unit of FIG. 2.

FIG. 3 shows one unit cell of the battery unit 21 of FIG. 2. Referring to FIG. 3, the cathode plate 23 includes a cathode collector 23a formed of expanded metal or punched metal using, for example, aluminum. Front and rear cathode active material layers 23b and 23c, which include a lithium oxide, a binder, a plasticizer, and a conductive material, are formed on both surfaces of the cathode collector 23a.

A cathode lead 26 is drawn out from one corner of the cathode collector 23a to a predetermined length. It is preferable that the cathode lead 26 be integrally formed with the cathode collector 23a for manufacturing efficiency.

The anode plate 24 is disposed opposite to the cathode plate 23 with the separator 25 therebetween. The anode plate 24 includes an anode collector 24a formed of, for example, copper foil. Front and rear anode active material layers 24b and 24c, which include a carbonic material, a binder, a plasticizer, and a conductive material, are formed on both surfaces of the anode collector 24a.

An anode lead 27 is drawn out to a predetermined length from the diagonally opposite corner of the anode collector 24a with respect to that corner of the cathode plate 23 from which the anode plate 24 extends. It is preferable that the anode lead 27 be integrally formed with the anode collector 24a.

The insulating member 210 is formed around the cathode lead 26, which is bent in a U-shape to be mounted in the case 22, as shown in FIG. 2. When the cathode lead 26 and the cathode collector 23a are cut together, burrs may result at the edge of the cathode lead 26. It is highly likely that the burrs of the cathode lead 26 penetrate the separator 25 and contact the anode plate 24, thereby causing an electrical short.

To prevent these electrical short circuits, a polymeric insulating member 210 is formed around the portion of the cathode lead 26 that seems to likely contact the anode plate 24 having the opposite polarity to the cathode lead 26.

Heat-resistant insulating tapes formed of, for example, polyethylenes or polypropylenes, can be used as the insulating member 210. Such an insulating tape may be thermally fused to that portion of the cathode lead 26.

Alternatively, the insulating member 210 can be formed using a polymeric resin composition containing, for example, polyethylenes, polypropylenes, or amorphous polyamides. In this case, a predetermined amount of the polymeric resin composition is dropped onto the cathode lead 26 and set by compression molding.

The insulating member 210 can be attached to the anode lead 27, instead of the cathode lead 26, or to both the cathode and anode leads 26 and 27.

A method for manufacturing electrode plates for the lithium polymer battery having the structure as described above will be described.

Figure 4:
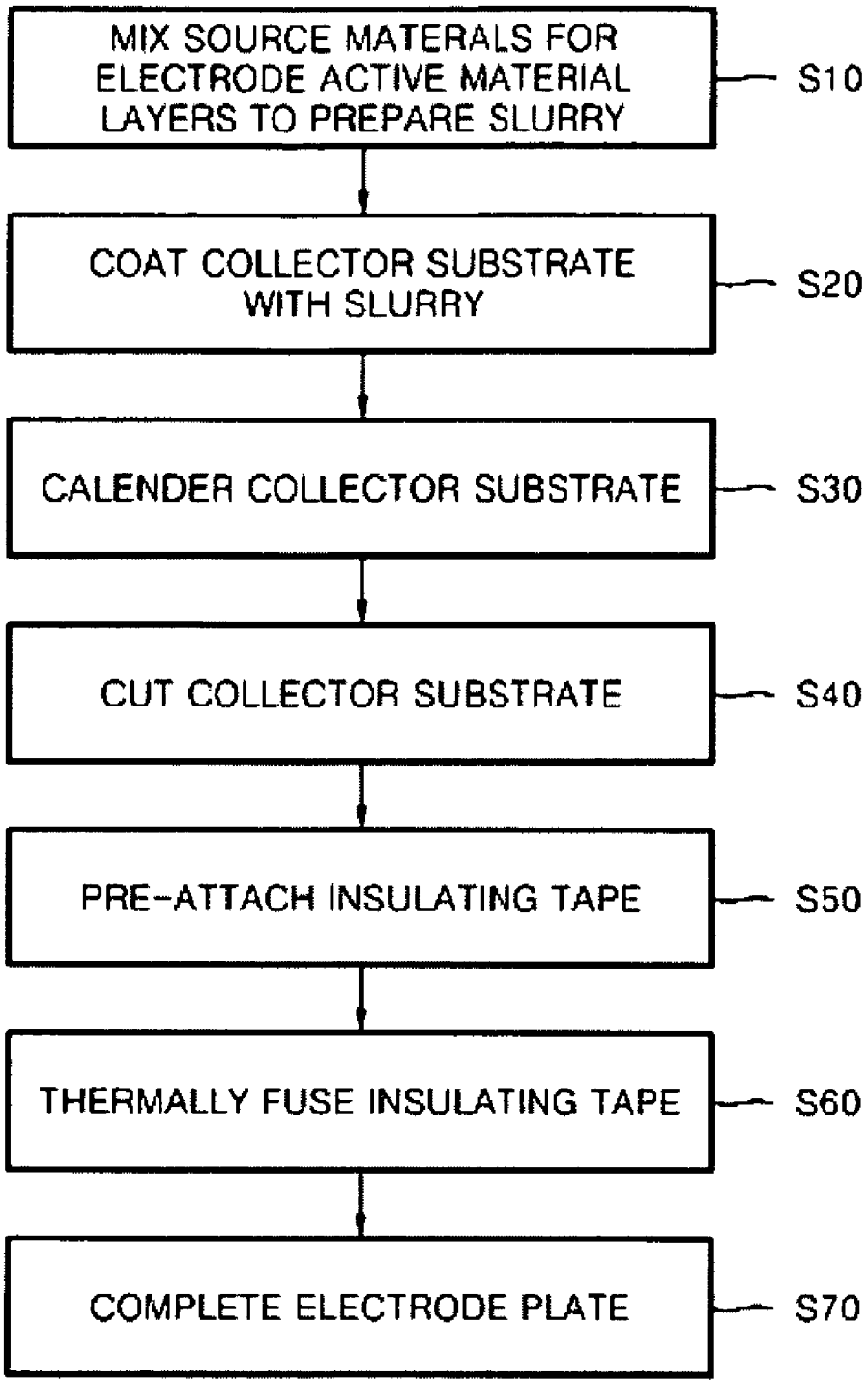
FIG. 4 is a flowchart for illustrating a method for manufacturing electrode plates for the battery unit of FIG. 2 according to an embodiment of the present invention.

FIG. 4 is a flowchart for illustrating an embodiment of a method for manufacturing electrode plates for the lithium polymer battery according to one embodiment of the present invention. As an example, the formation of cathode plates will be described below with reference to FIG. 4. As shown in FIG. 3, the cathode plate 23 includes the cathode collector 23a and the front and rear cathode active material layers 23b and 23c. Initially, to form the front and rear cathode active material layers 23b and 23c, source materials for the cathode active material layers are mixed together. In particular, a lithium oxide as a cathode active material, a conductive material, and a plasticizer are mixed with a binder solution to prepare a slurry (S10).

For efficient large-scale production, a plurality of cathode collectors 23a are simultaneously formed using a single, large aluminum foil (hereinafter, referred to as a "cathode collector substrate"). Both surfaces of the cathode collector substrate are coated with the slurry for the cathode active material layers 23b and 23c in a pattern corresponding to the shape of the cathode active material layers 23b and 23c (S20). Coating both surfaces of the cathode collector substrate with the slurry for the front and rear cathode active material layers 23b and 23c may be performed by casting.

To improve the adhesion of the active material layers to the cathode collector substrate, which is preferably made of expanded or punched aluminum, and to reduce the interfacial resistance therebetween for the extended lifespan and enhanced charging/discharging properties of the battery, foreign materials on the surfaces of the cathode collector substrate are removed prior to coating the cathode collector substrate with the slurry. After coating the slurry for the front and rear cathode active material layers 23b and 23c on both surfaces of the cathode collector substrate, a calendaring process is performed in order to enhance the adhesion of the front and rear cathode active material layers 23b and 23c to the cathode collector substrate and to correct thickness deviations that may be present in the front and rear cathode active material layers 23b and 23c. The calendaring process is preferably performed by passing the cathode collector substrate coated with the slurry between heating rollers (S30).

Next, the cathode collector substrate with the pattern of the front and rear cathode active material layers 23b and 23c is cut into individual cathode collectors 23a having a predetermined shape using a mold. Each of the resulting cathode collectors 23a has a cathode lead 26 extending from one edge of the cathode collector (S40).

Next, the insulating member 210, for example, an insulating tape, is pre-attached to the cathode lead 26 (S50). The insulating tape for the insulating member 210 can be formed of polypropylenes or polyethylenes having a low melting point of about 150° C. or less. The insulating tape includes a tape layer having a thickness of about 20-70 μm and an adhesive layer coated on the tape layer and having a thickness of about 5-20 μm. The insulating member 210 is pre-attached around a portion of the cathode lead 26 and preferably has a width of about 2-4 mm.

After the insulating member 210 is pre-attached to the cathode lead 26, the cathode lead 26 is preferably passed between rollers pre-heated to a temperature of about 140-180° C. so that the insulating member 210 is thermally fused to the cathode lead 26 (S60). At this time, there is a need to control the thickness of the adhesive layer of the insulating member 210 so as to prevent agglomeration of the adhesive composition in the adhesive layer coated on the tape layer as the tape layer is fused to the cathode lead 26. The temperature of and the space between the rollers needs to be uniformly maintained in order to allow easier thermal fusion of the insulating member 210 and so that no foreign materials remain on the surfaces of the rollers after fusing.

In step S60, another consideration is to maintain the surface evenness of an insulating member applying roller (not shown) in order to prevent the melted tape layer of the insulating member 210 from spreading toward the cathode collector 23a. In addition, the rotating rate of the insulating member applying roller needs to be substantially the same as the rate at which the cathode collector 23a is moved on a conveyer belt, and the insulating member applying roller needs to apply the insulating member 210 in a tensioned state to the cathode lead 26 in order to prevent sagging of the insulating member 210.

Steps S10 through S60 provide a complete cathode plate 23 including the cathode collector 23a which has the front and rear cathode active material layers 23b and 23c and the cathode lead 26 which extends from one side of the cathode collector 23a and to which the insulating member 210 for preventing electrical contact between the cathode lead 26 and the anode plate 24 is thermally fused (S70).

The above-described method for manufacturing the cathode plates for the secondary battery according to the present invention can be applied to the formation of anode plates having the opposite polarity to the cathode plates. In manufacturing anode plates, copper foil is preferably used as an anode collector substrate. Front and rear anode active material layers 24b and 24c are formed on both surfaces of the anode collector 24a, with the anode lead 27 extending from one edge of the anode collector 24a. The insulating member 210 may also be attached to the anode lead 27. Alternatively, the insulating member 210 may be attached only to the anode lead 27, not to the cathode lead 26.

Figure 5:
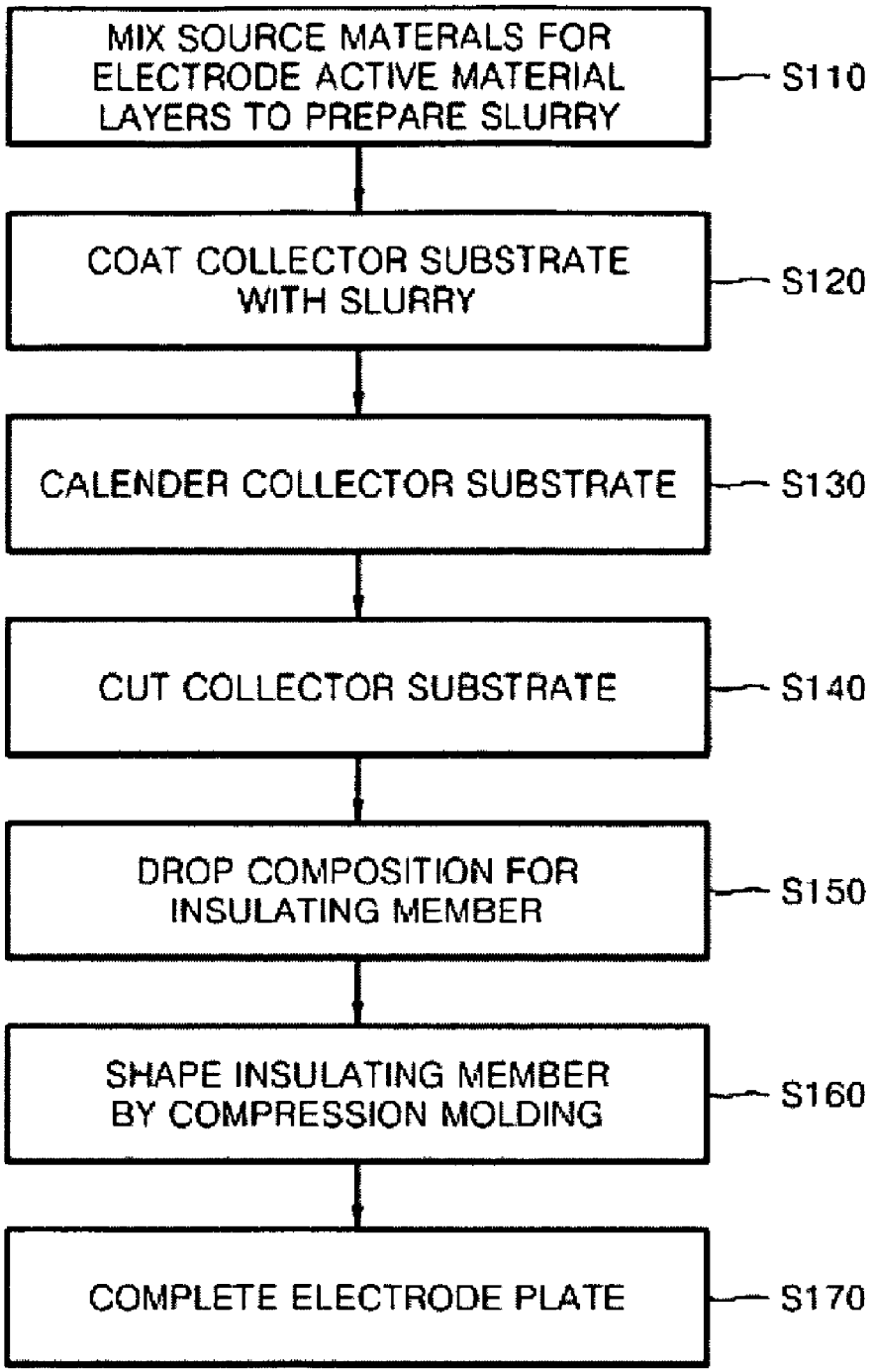
FIG. 5 is a flowchart for illustrating a method for manufacturing electrode plates for the battery unit of FIG. 2 according to another embodiment of the present invention.

FIG. 5 is a flowchart for illustrating another embodiment of a method for manufacturing electrode plates for the lithium polymer battery according to the pre invention. As an example, the formation of cathode plates will be described below with reference to FIG. 5.

Initially, source materials for the front and rear cathode active material layers 23b and 23c are mixed together. In particular, a lithium oxide, a plasticizer, and a conductive material are mixed with a binder solution to prepare a slurry (S110).

The prepared slurry for the front and rear cathode active material layers 23b and 23c is coated on the front and rear surfaces of a cathode collector substrate from which foreign materials have been removed through a pre-treatment (S120). Both surfaces of the cathode collector substrate are coated with the slurry for the front and rear cathode active material layers 23b and 23c. This step is preferably performed by casting.

After coating the slurry for the front and rear cathode active material layers 23b and 23c on both surfaces of the cathode collector substrate, a calendaring process is performed in order to enhance the adhesion of the front and rear cathode active material layers 23b and 23c to the cathode collector substrate (S130). Next, the cathode collector substrate with the front and rear cathode active material layers 23b and 23c is cut into individual cathode collectors 23a having a predetermined shape using a mold. Each of the resulting cathode collectors 23a has a cathode lead 26 extending from its one edge (S140). In other words, the cathode lead 26 is integrally formed with the cathode collector 23a.

Next, a composition for the insulating member 210 is dropped onto at least a portion of the cathode lead 26. The composition for the insulating member 210 may be a polymeric emulsion containing, for example, polypropylenes, polyethyelenes, or amorphous polyamides.

Suitable polypropylenes include stereospecific polymers, such as atactic polymers, syndiotactic polymers, and isotatic polymers, having a melting point of about 120-160° C. and a melt flow index of about 15 g/10 min. Suitable polyethylenes have a degree of crystallinity of about 20-50% and a melt flow index of 5 g/min or greater. Suitable polyethylenes also include high density polyethylenes having a melting point of about 100-160° C., linear low density polyethylenes having a melting point of about 100-140° C., and linear low density polyethylenes having a melting point of about 90-120° C.

Preferably, a composition containing 1-5% acrylic acid by weight and the balance of a polypropylene or polyethylene matrix polymer is coated on the cathode lead 26 for adhesion enhancement.

Suitable amorphous polyamides may have a melting point of about 120-160.degree. C.

The composition for the insulating member is preferably dropped onto the cathode lead 26 through a single or a plurality of screw extruders and then a temperature regulator (S150). At this time, it is preferable that a precise pressure gauge be attached to the extruder so as to accurately control the pressure at which the composition for the insulating member is dispensed.

After the composition for the insulating member 210 is dropped onto the cathode lead 26, compression molding is performed using a mold in order to shape an insulating member having a preferable width of about 1.5-4.5 mm and a preferable length of 2.0-2.5 mm (S160).

In order to easily release the insulating member while keeping it intact and in the desired shape from the mold and onto the cathode lead 26, it is preferable that a release agent be coated on the inside of the mold for compression molding.

Steps S110 through S160 provide a complete cathode plate 23 including the cathode collector 23a which has the front and rear cathode active material layers 23b and 23c and the cathode lead 26 which extends from one edge of the cathode collector 23a and on which the insulating member 210 for preventing electrical contact between the cathode lead 26 and the anode plate 24 is formed by compression molding (S170).

A battery unit according to the present invention and a lithium polymer battery using the battery unit according to the present invention, which is manufactured by the above-described method according to the present invention, improves the safety and reliability of the battery. It also prevents a voltage drop.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

[1. A method for manufacturing a lithium polymer battery, comprising steps of:

mixing source materials for an electrode active material layer;

coating at least one surface of a collector substrate with the mixture of the source materials in a pattern corresponding to the electrode active material layer;

cutting the collector substrate with the pattern of the electrode active material layer into individual collectors;

attaching an electrode terminal to an electrode lead winding a sealing tape on a portion of the electrode terminal that will be in contact with a sealing portion of a battery case;

pre-attaching an insulating member to the electrode lead extending from each of the collectors;

thermally fusing the insulating member to the electrode lead; and completing formation of an electrode plate including the collector which has the electrode active material layer and the electrode lead which extends from the collector and to which the insulating member is fused.]

[2. The method of claim 1, wherein in pre-attaching the insulating member to the electrode lead, a polypropylene tape is attached around a portion of the electrode lead.]

[3. The method of claim 1, wherein in pre-attaching the insulating member to the electrode lead, a polyethylene tape is attached around a portion of the electrode lead.]

[4. The method of claim 1, wherein in pre-attaching the insulating member to the electrode lead, an amorphous polyamide tape is attached around a portion of the electrode lead.]

[5. A method for manufacturing a lithium polymer battery, comprising:

coating at least one surface of a collector substrate with an electrode active material layer;

cutting the coated collector substrate into individual collectors, each individual collector having an electrode lead extending from the collector;

attaching an insulating member to the electrode lead;

thermally fusing the insulating member to the electrode lead;

attaching an electrode terminal to the electrode lead having the thermally fused insulating member, the electrode lead being arranged between the collector and the electrode terminal and winding a sealing tape on a portion of the electrode terminal that will be in contact with a sealing portion of a battery case.]

[6. The method of claim 5, wherein attaching the insulating member to the electrode lead comprises attaching a polypropylene tape around a portion of the electrode lead.]

[7. The method of claim 5, wherein attaching the insulating member to the electrode lead comprises attaching a polyethylene tape around a portion of the electrode lead.]

[8. The method of claim 5, wherein attaching the insulating member to the electrode lead comprises attaching an amorphous polyamide tape around a portion of the electrode lead.]

[9. The method of claim 5, further comprising winding a sealing tape around a portion of the electrode terminal.]

[10. The method of claim 5, wherein coating at least one surface of a collector substrate with an electrode active material layer comprises:

mixing source materials for the electrode active material layer; and coating the at least one surface of the collector substrate with the mixture of the source materials in a pattern corresponding to the electrode active material layer.]

*11. A secondary battery, comprising:*

*a plurality of cathode plates each comprising a cathode collector, a cathode lead having a bent U-shape, and a cathode active material layer coated on at least one surface of the cathode collector;*

*a cathode terminal attached to the cathode leads;*

*a plurality of anode plates each comprising an anode collector, an anode lead, and an anode active material layer coated on at least one surface of the anode collector;*

*an anode terminal attached to the anode leads;*

*a separator interposed between the cathode plates and the anode plates, thereby insulating the cathode plates and the anode plates from each other;*

*an insulating member arranged around each of the cathode leads, each of the anode leads, or both of each of the cathode leads and each of the anode leads; and*

*a sealing tape arranged on a portion of the cathode terminal in contact with a sealing portion of a battery case, a portion of the anode terminal in contact with a sealing portion of a battery case, or both the portion of the cathode terminal and the portion of the anode terminal in contact with a sealing portion of a battery case.*

*12. The secondary battery of claim 11, wherein the insulating member comprises a polypropylene, a polyethylene, or an amorphous polyimide.*

*13. The secondary battery of claim 11, wherein the insulating member is arranged between the cathode plates and the cathode terminal, between the anode plates and the anode terminal, or both between the cathode plates and the cathode terminal and between the anode plates and the anode terminal.*

*14. The secondary battery of claim 11, wherein the insulating member has a width in the range of about 2 mm to 4 mm.*

*15. The secondary battery of claim 11, wherein the insulating member has a width in the range of about 1.5 mm to 4.5 mm.*

*16. The secondary battery of claim 15, wherein the insulating member has a length in the range of about 2.0 mm to 2.5 mm.*

*17. The secondary battery of claim 11, wherein the insulating member is arranged on each of the anode leads only, the insulating member being arranged around a portion of each of the anode leads arranged near the cathode plate.*

*18. The secondary battery of claim 11, wherein each cathode plate further comprises the cathode lead extending from and integrally formed with the cathode collector, and*

*wherein each anode plate further comprises the anode lead extending from and integrally formed with the anode collector.*

*19. The secondary battery of claim 11, wherein the insulating member is arranged around a portion of each of the cathode leads arranged near the anode plate, a portion of each of the anode leads arranged near the cathode plate, or both the portion of each of the cathode leads arranged near the anode plate and the portion of each of the anode leads arranged near the cathode plate.*

* * * * *